(12) United States Patent
Wisnia

(10) Patent No.: US 10,196,039 B2
(45) Date of Patent: *Feb. 5, 2019

(54) SYSTEM AND METHOD FOR KEYLESS ENTRY AND REMOTE STARTING VEHICLE WITH AN OEM REMOTE EMBEDDED IN VEHICLE

(71) Applicant: Light Wave Technology Inc., Ville St-Laurent (CA)

(72) Inventor: Jack Wisnia, Dollard-des Ormeaux (CA)

(73) Assignee: Light Wave Technology Inc., Ville St-Laurent, QC (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/389,029

(22) Filed: Dec. 22, 2016

(65) Prior Publication Data

US 2017/0101077 A1 Apr. 13, 2017

Related U.S. Application Data

(63) Continuation of application No. 14/290,614, filed on May 29, 2014, now Pat. No. 9,536,365.

(Continued)

(51) Int. Cl.
*B60R 25/24* (2013.01)
*B60R 25/20* (2013.01)
(Continued)

(52) U.S. Cl.
CPC ............ *B60R 25/24* (2013.01); *B60R 25/209* (2013.01); *G07C 9/00309* (2013.01); *G08C 17/02* (2013.01); *G07C 2009/00206* (2013.01);
*G07C 2009/00547* (2013.01); *G07C 2009/00793* (2013.01); *G08C 2201/93* (2013.01)

(58) Field of Classification Search
CPC ............ B60R 25/245; B60R 25/02153; B60R 25/2063; B60R 25/02; B60R 25/10; B60R 25/209; G07C 2009/00333; G07C 2009/00396; G07C 2009/00603; G07C 2009/00206; Y10T 70/5956
See application file for complete search history.

(56) References Cited

U.S. PATENT DOCUMENTS 5,874,785 A 2/1999 Liu
5,937,065 A 8/1999 Simon et al.
(Continued)

*Primary Examiner* — Mirza Alam
(74) *Attorney, Agent, or Firm* — Anglehart et al.

(57) ABSTRACT

A vehicle comprising a keyless go system, and at least one key fob, said keyless go system being operatively connected to a locking/unlocking subsystem and an engine start subsystem, said vehicle further comprising at least one LF transmitter, at least one LF receiver, at least one HF transmitter and at least one HF receiver, said vehicle further comprising an aftermarket keyless go system interfacing with said keyless go system, wherein at least one of said at least one key fob is embedded into said vehicle, and wherein when a user sends a lock/unlock command, or a start command with a portable device, said aftermarket keyless go system interacts with said embedded key fob to selectively enable and disable low frequency communication between said embedded key fob and said keyless go system.

6 Claims, 2 Drawing Sheets

Related U.S. Application Data

(60) Provisional application No. 61/828,424, filed on May 29, 2013.

(51) Int. Cl.
  *G07C 9/00* (2006.01)
  *G08C 17/02* (2006.01)

(56) References Cited

U.S. PATENT DOCUMENTS

| | | | |
|---|---|---|---|
| 6,037,675 | A | 3/2000 | Yoshida et al. |
| 6,218,932 | B1 | 4/2001 | Stippler |
| 6,323,566 | B1 | 11/2001 | Meier |
| 6,538,560 | B1 * | 3/2003 | Stobbe ............... B29C 44/56 340/5.72 |
| 6,662,085 | B2 | 12/2003 | Chang |
| 6,714,119 | B1 * | 3/2004 | Mindl ............... B60R 25/24 340/5.61 |
| 6,747,545 | B2 | 6/2004 | Nowottnick et al. |
| 6,960,981 | B2 | 11/2005 | Blatz |
| 7,091,835 | B2 | 8/2006 | Boulay et al. |
| 7,466,219 | B2 | 12/2008 | Ishimura et al. |
| 7,613,551 | B2 | 11/2009 | Watanabe et al. |
| 7,629,919 | B2 | 12/2009 | Wilcox |
| 7,650,864 | B2 | 1/2010 | Hassan et al. |
| 7,683,757 | B2 | 3/2010 | King et al. |
| 7,783,451 | B2 | 8/2010 | Wilcox et al. |
| 7,791,457 | B2 | 9/2010 | Ghabra et al. |
| 7,808,424 | B2 | 10/2010 | Wilcox |
| 7,915,997 | B2 | 3/2011 | King et al. |
| 7,978,049 | B2 | 7/2011 | Leitch |
| 8,077,011 | B2 | 12/2011 | McBride et al. |
| 8,112,185 | B2 | 2/2012 | Wu |
| 8,254,869 | B2 | 8/2012 | Hyde et al. |
| 8,264,320 | B2 | 9/2012 | Nelson |
| 8,421,589 | B2 | 4/2013 | Sultan et al. |
| 8,825,224 | B2 | 9/2014 | Fazi |
| 8,983,534 | B2 | 3/2015 | Patel |
| 2001/0033222 | A1 | 10/2001 | Nowottnick et al. |
| 2003/0222757 | A1 | 12/2003 | Ghabra et al. |
| 2003/0222813 | A1 | 12/2003 | Boulay et al. |
| 2004/0135435 | A1 | 7/2004 | Nelson |
| 2004/0222899 | A1 | 11/2004 | Yezersky et al. |
| 2005/0033484 | A1 | 2/2005 | Geber et al. |
| 2005/0090952 | A1 | 4/2005 | Boulay et al. |
| 2005/0168322 | A1 | 8/2005 | Appenrodt et al. |
| 2006/0044108 | A1 | 3/2006 | Nowottnick |
| 2006/0071555 | A1 | 4/2006 | Borngraber et al. |
| 2006/0114100 | A1 * | 6/2006 | Ghabra ............... E05B 81/78 340/5.61 |
| 2006/0164207 | A1 | 7/2006 | Wilcox |
| 2006/0266089 | A1 | 11/2006 | Dimig |
| 2007/0021082 | A1 | 1/2007 | Okumura et al. |
| 2007/0085658 | A1 * | 4/2007 | King ............... B60R 25/24 340/5.72 |
| 2008/0042801 | A1 | 2/2008 | Nelson |
| 2008/0079603 | A1 | 4/2008 | King et al. |
| 2008/0106391 | A1 | 5/2008 | Santavicca et al. |
| 2008/0109123 | A1 | 5/2008 | Kachouh et al. |
| 2008/0284564 | A1 | 11/2008 | Leitch |
| 2009/0009303 | A1 | 1/2009 | Fujioka et al. |
| 2009/0133453 | A1 * | 5/2009 | Mueller ............ B60R 25/02153 70/252 |
| 2009/0206989 | A1 | 8/2009 | Leitch |
| 2009/0206990 | A1 | 8/2009 | Nelson |
| 2009/0212906 | A1 | 8/2009 | Michel et al. |
| 2009/0256677 | A1 | 10/2009 | Hein et al. |
| 2010/0026557 | A1 | 2/2010 | Wilcox |
| 2010/0141389 | A1 | 6/2010 | Hagl et al. |
| 2010/0188192 | A1 * | 7/2010 | Lumley ............... B60R 25/10 340/5.64 |
| 2010/0217457 | A1 | 8/2010 | Georgi et al. |
| 2010/0231351 | A1 | 9/2010 | Lickfelt et al. |
| 2010/0305779 | A1 | 12/2010 | Hassan et al. |
| 2011/0102138 | A1 | 5/2011 | Girard, III et al. |
| 2011/0102139 | A1 | 5/2011 | Girard, III et al. |
| 2011/0112969 | A1 | 5/2011 | Zaid et al. |
| 2011/0257817 | A1 | 10/2011 | Tieman |
| 2012/0031155 | A1 | 2/2012 | Shimura et al. |
| 2012/0268242 | A1 | 10/2012 | Tieman et al. |
| 2012/0280788 | A1 | 11/2012 | Nowottnick |
| 2012/0303182 | A1 | 11/2012 | Choi |
| 2013/0079952 | A1 | 3/2013 | Fazi |
| 2013/0110318 | A1 | 5/2013 | Colja et al. |
| 2013/0176069 | A1 * | 7/2013 | Leong ............... B60R 25/24 327/517 |
| 2013/0268141 | A1 | 10/2013 | Du et al. |
| 2013/0268142 | A1 | 10/2013 | Du et al. |
| 2013/0268143 | A1 | 10/2013 | Du et al. |
| 2013/0268144 | A1 | 10/2013 | Du et al. |
| 2014/0240086 | A1 | 8/2014 | Van Wiemeersch |
| 2014/0240090 | A1 | 8/2014 | Mutti et al. |
| 2014/0285319 | A1 | 9/2014 | Khan et al. |
| 2014/0327517 | A1 | 11/2014 | Portet |

* cited by examiner

SYSTEM AND METHOD FOR KEYLESS ENTRY AND REMOTE STARTING VEHICLE WITH AN OEM REMOTE EMBEDDED IN VEHICLE

This application is a Continuation of U.S. patent application Ser. No. 14/290,614, filed 29 May 2014, which claims benefit of U.S. Provisional Patent Application Ser. No. 61/828,424, filed 29 May 2013 and which applications are incorporated herein by reference. To the extent appropriate, a claim of priority is made to each of the above disclosed applications.

FIELD OF THE INVENTION

The present invention is directed to a system and method for keyless entry, and remote starting of a vehicle, where the vehicle has an OEM remote embedded in the vehicle.

BACKGROUND OF THE INVENTION

Vehicles were traditionally locked and unlocked, and started, with a physical key. As advances in technology were made, remote locking and unlocking became standard on many models. Remote starters, both OEM and aftermarket, are now also prevalent, and are gaining in popularity. In the area of convenience for users of vehicles, remote keyless entry and push to start systems, once reserved for higher end luxury vehicles, are now trickling down to mid-range and entry level models.

As automation and convenience features have gained in popularity, so have thieves' efforts to defeat these systems. In the field of wireless communication, encryption, and techniques such as spread-spectrum or code hopping have been adopted by car manufacturers to increase the security of these systems.

It is often desirable to provide aftermarket remote starting and remote locking and unlocking of the vehicle. In order to maintain the integrity of the OEM system, aftermarket providers are often required to leave an OEM remote FOB inside the vehicle, hidden. This is becoming an irritant for users as they must purchase an extra OEM remote, which are expensive, in part because of the security that is embedded in them.

SUMMARY OF THE INVENTION

It is therefore an object of the invention to provide a system and method to allow keyless entry and remote starting of a vehicle, without requiring the user to carry an extra FOB which includes the OEM FOB. The user utilizes his own remote A for authentication in order to unlock/lock the vehicle while entering/exiting the vehicle without the need of an OEM remote B which is embedded in the vehicle. The same remote A is used for authentication inside the vehicle for the purpose of starting the engine by pushing the start button or turning a knob in the vehicle. The user's remote A remains in the user's pocket.

Among the advantages of the invention, it will appear to a person skilled in the art that no FOB of any kind is required to unlock/lock the vehicle. A GSM phone or a device that contains a Bluetooth or Wifi transceiver can also start the car.

If device A is a key fob, only one key fob is required for to unlock/lock and remote start. In a growing number of cars, an antitheft bypass simulating the OEM fob security features is not available. Embedding an existing OEM remote B and using the system and method of the present invention enables all users of the vehicle to carry only a single device, and avoids the purchase of another key fob, which is potentially quite expensive and time consuming.

In accordance with a first aspect of the invention, there is provided a keyless entry system for a vehicle, said vehicle being provided with an OEM remote inside a vehicle, said keyless entry system being operatively connected to a security system of said vehicle, said keyless entry system being adapted to selectively block low frequency transmissions from said security system to said OEM remote when said security system receives an indication that a user unlocks said vehicle, in order to permit locking or unlocking of said vehicle, or remote starting of said vehicle.

In accordance with a second aspect of the invention, there is provided a vehicle comprising a keyless go system, and at least one key fob, said keyless go system being operatively connected to a locking/unlocking subsystem and an engine start subsystem, said vehicle further comprising at least one LF transmitter, at least one LF receiver, at least one HF transmitter and at least one HF receiver, said vehicle further comprising an aftermarket keyless go system interfacing with said keyless go system, wherein at least one of said at least one key fob is embedded into said vehicle, and wherein when a user sends a lock/unlock command, or a start command with a portable device, said aftermarket keyless go system interacts with said embedded key fob to selectively enable and disable low frequency communication between said embedded key fob and said keyless go system.

In accordance with a third aspect of the invention, there is provided an aftermarket keyless go system interfacing with an on-board keyless go system in a vehicle, said aftermarket keyless go system interacting with an aftermarket remote starter, said aftermarket keyless go system being adapted to interact with said on-board keyless go system, said vehicle being provided with an OEM key fob embedded inside said vehicle, in order to permit a user to start said vehicle by pressing a predetermined sequence of keys on said aftermarket remote starter, causing said aftermarket keyless do system to selectively enable/disable said OEM key fob.

BRIEF DESCRIPTION OF THE DRAWINGS

The present invention will be better understood after having read a description of a preferred embodiment thereof, made in reference with the following drawings, in which.

DESCRIPTION OF A PREFERRED EMBODIMENT OF THE INVENTION

Figure 1:
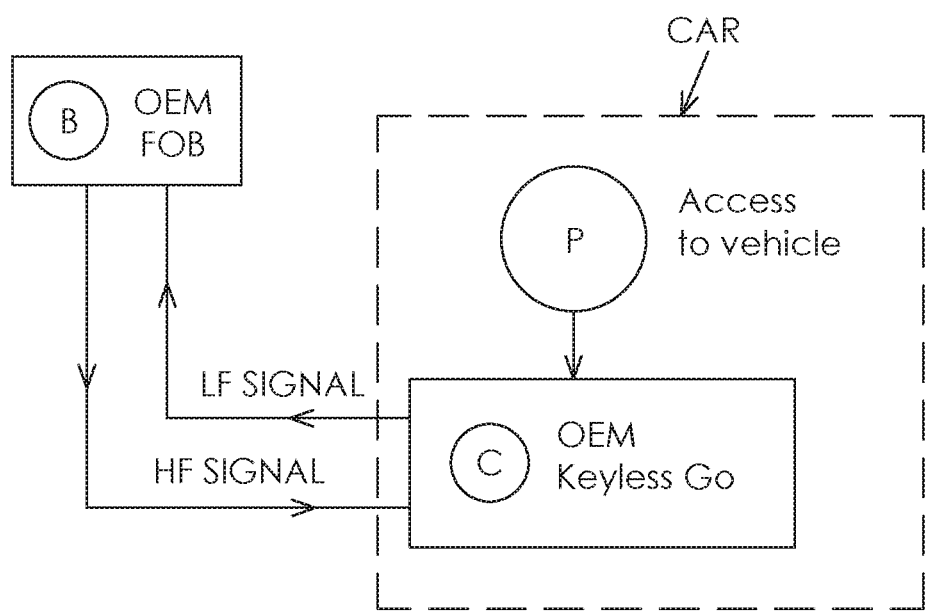
FIG. 1 is a schematic representation of a prior art system.

In the following description of a preferred embodiment of the invention, the following terms and expressions are used:
1 IAM—Independent aftermarket
2. Device A: either one of the following
  a. IAM key fob
  b. Mobile phone with Bluetooth or Wi-Fi
  c. Other device with Bluetooth or Wi-Fi d. Any other device that is adapted to effect bi-directional communication with the vehicle and offers positive identification, such as RFID.
3. Device B—OEM key fob
4. Device C—OEM Keyless Go system in vehicle
5. Device D—IAM keyless go system
6. LF receiver—device that receives coded low-frequency RF signal in the low frequency range typically 125 kHz
7. LF transmitter—A device that transmits coded low-frequency RF signal in the low frequency range typically 125 kHz
8. HF transmitter—Device that transmits a coded high-frequency RF signal in the high-frequency range typically 300 MHz AM or FM
9. Access P—a pushbutton on the handle of the vehicle door or a touch sensor inside the door handle allowing the user to unlock/lock the vehicle door
10. KG—Keyless Go Normal Operation The general operation of common keyless go systems which uses RFID is as follows [see FIG. 1]:

The OEM remote B contains a LF receiver and a HF transmitter.

The user approaches the car and activates the door entry system by pulling on the door handle or pressing a pushbutton on the door handle. This action activates the OEM KG system C to transmit a challenge to the OEM remote B by sending a LF transmission to the OEM remote B asking for authentication. OEM remote B upon receiving request, responds by sending an HF radio response to the KG system C which contains a HF receiver. The KG system C authenticates the response and unlocks the door. Similarly the same authentication process occurs when the user sits in the vehicle and pushes the start button to start the vehicle.

Preferred Embodiment

Figure 2:
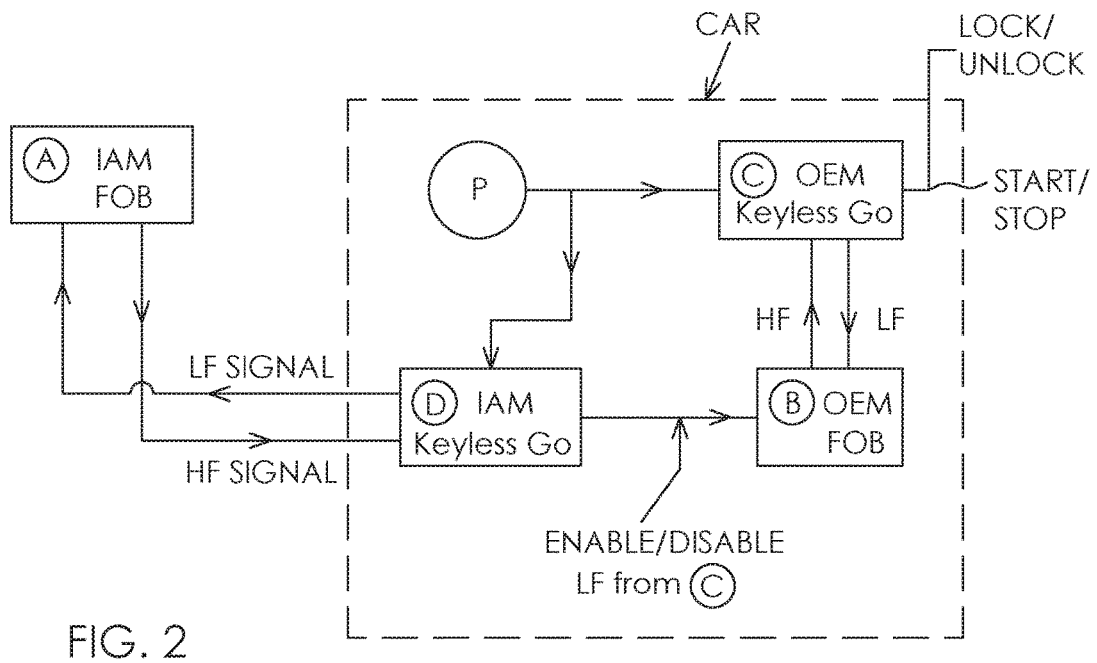
FIG. 2 is a schematic representation of a preferred embodiment of the present invention.

In one preferred embodiment illustrated in FIG. 2, the invention concerns an improvement over the above described system, where an OEM remote is embedded inside the vehicle. Remote B is in communication with system C by wire or wireless means.

System C along with remote B authenticates key fob A providing key fob A is close enough to the vehicle allowing unlocking/locking and remote start. In a sense, system C, remote B and device A are "paired", in that device A is registered with system C and remote B.

System D is an IAM module that is embedded in the vehicle. Module D contains an HF receiver and an LF transmitter. Upon receipt of a signal from the pushbutton of the car, System D then sends an LF signal to remote A. Remote A upon receipt of LF signal then transmits a HF signal to system D. System D authenticates Remote A as a valid user.

When the pushbutton of the car is pressed, system C tries to communicate with OEM remote B seeking authentication. System D controls OEM remote B by blocking or unblocking the LF signal from system C, or enable/disable the power supply of remote B.

If System D does not authenticate remote A it will block the OEM remote from receiving the LF signal from system C. This prevents any random user to gain entry unless he has Remote A.

It is important to note that system C will still work with any user that has an OEM remote.

A similar process ensues when the user wants to start the car.

Locking the Car

Most cars will not allow the user to lock the car using Access P, while the OEM remote is inside the vehicle.

The KG system A has two LF transmitting antennae. On each action by the user, the car sends transmissions from each antenna in sequence separated by a certain time interval. Each antenna has a different power level. The second antenna with the lower power level will only get a response if the OEM remote is inside the car. The first antenna with a higher power level will get a response of the OEM remote is outside the car. By sending sequential signals and analyzing the response signals, the system can determine whether the remote is inside the car or outside the car. This way the user can lock the car by using access P and not leave the OEM remote inside the car.

In the aftermarket system of the present invention, system D will block the lower power antenna transmission, or disable power supply of OEM remote during the low power antennae transmission, so that the OEM remote does not respond, in effect tricking the car into thinking that the OEM remote is outside the car (because the OEM remote will respond to the higher power antenna). For this system to work, system D must be synchronized with the antenna signals.

Using an Embedded OEM Remote as an Extra Key

Figure 3:
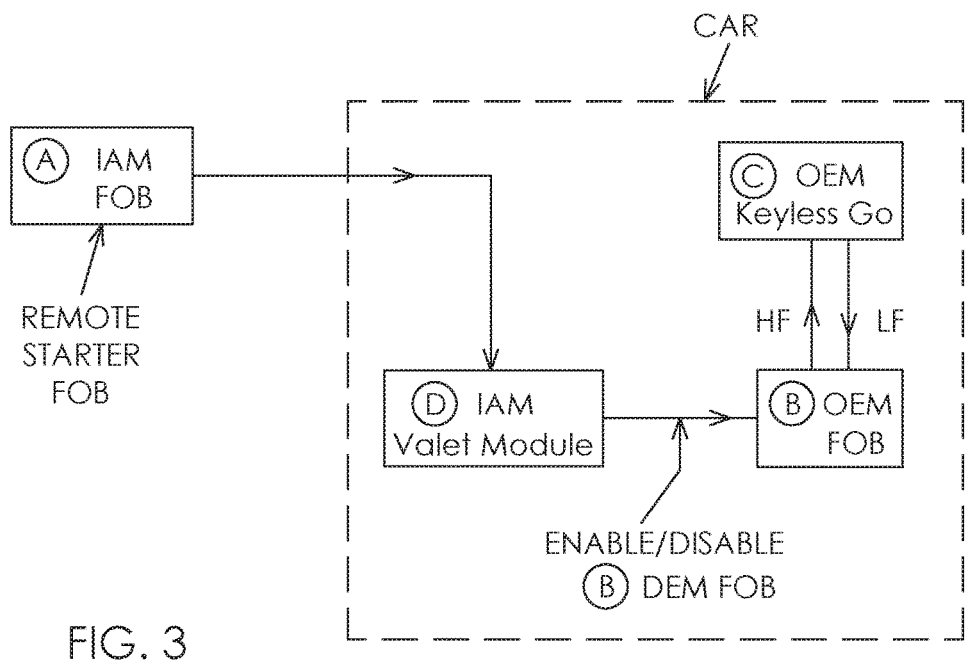
FIG. 3 is a schematic representation of another preferred embodiment of the present invention, particularly as a "valet" system, or a back-up system in case a user has lost an OEM key fob.

In this case, as illustrated in FIG. 3, the installer has chosen to embed an OEM remote as a bypass because a data bypass is not available. This is quite common. What is proposed is a novel solution to a case where the user has lost his primary OEM remote. Using the method described earlier where system D can enable/disable the OEM remote B, the user can enable the OEM remote B by using his remote starter remote A using a predetermined sequence of key presses. Note that enabling/disabling OEM remote B can be done in a variety of ways such as blocking LF signals or disabling the power supply, among others, as is known to a person skilled in the art.

For example if the user has lost his primary remote. The user unlocks the car with his remote starter remote A, and uses the predetermined sequence of button presses to enable the OEM remote. The car will recognize that the OEM remote is inside the vehicle and allow the user to start the vehicle. In this embodiment the remote starter remote A does not have to be a RFID remote since the only authentication that takes place between Remote A and Module D is the RF signal with the predetermined button presses.

Although the present invention has been explained hereinabove by way of a preferred embodiment thereof, it should be pointed out that any modifications to this preferred embodiment within the scope of the appended claims is not deemed to alter or change the nature and scope of the present invention.

The invention claimed is:

1. An after-market keyless go system configured to interact with an original equipment manufacturer security system of a vehicle, wherein said original equipment manufacturer security system comprises an exterior vehicle door handle with a push button or a touch sensor accessed by a user for locking or unlocking said vehicle, an original equipment manufacturer (OEM) key fob embedded in said vehicle, and an original equipment manufacturer (OEM) keyless go system adapted to communicate with said OEM key fob at a low power level and a high power level, said after-market keyless go system configured to:

receive a command signal from said push button or said touch sensor of said door handle when lock input is received at said push button or said touch sensor of said door handle: and upon said push button or said touch sensor receiving said lock input, selectively disabling said low power level communication between said embedded OEM key fob and said OEM keyless go system by one of:

disabling power supplied to said OEM key fob embedded in said vehicle: and blocking low power level communication between said OEM keyless go system to said OEM key fob embedded in said vehicle, while allowing said high power level communication between said embedded OEM key fob and said OEM keyless go system, thereby resulting in said OEM keyless go system determining that said OEM key fob is outside said vehicle despite said OEM key fob being embedded in said vehicle, and allowing said original equipment manufacturer security system of said vehicle to lock said vehicle while said OEM key fob is embedded in said vehicle.

2. The system as defined in claim 1, wherein said exterior vehicle door handle has a push button.

3. The system as defined in claim 1, wherein said selectively disabling said low power level communication between said embedded OEM key fob and said OEM keyless go system is performed by removing power supplied to said OEM key fob.

4. The system as defined in claim 1, wherein said selectively disabling said low power level communication between said embedded OEM key fob and said OEM keyless go system is performed by blocking low power level signal transmission transmitted from said OEM keyless go system.

5. The system as defined in claim 1, wherein said exterior vehicle door handle has a touch sensor.

6. A method for locking a vehicle equipped with an after-market keyless go device configured to interact with an original equipment manufacturer security system of a vehicle of the type that communicates with an OEM key fob, said security system being adapted to communicate with said OEM key fob at a low power level and a high power level, said method comprising:

detecting a door lock command through communication with said original equipment manufacturer security system of said vehicle;

disabling said low power level communication between said embedded OEM key fob and said security system by one of:

disabling power supplied to said OEM key fob embedded in said vehicle; and blocking low power level communication between said OEM keyless go system to said OEM key fob embedded in said vehicle, to allow said OEM key fob to interact with said original equipment manufacturer security system of said vehicle in a manner that causes said original equipment manufacturer security system of said vehicle to determine that the OEM remote is outside said vehicle, wherein high power level communication between said embedded OEM key fob and said OEM keyless go system is allowed, while low power level communication between said OEM keyless go system to said OEM key fob embedded in said vehicle is prevented, thereby resulting in said original equipment manufacturer security system determining that said OEM key fob is outside said vehicle despite said OEM key fob being embedded in said vehicle, and allowing said original equipment manufacturer security system of said vehicle to lock said vehicle while said OEM key fob is embedded in said vehicle.

* * * * *